(12) United States Patent
Kaneyoshi et al.

(10) Patent No.: US 10,316,248 B2
(45) Date of Patent: Jun. 11, 2019

(54) HEXAFLUOROMANGANATE (IV), COMPLEX FLUORIDE PHOSPHOR, AND METHODS RESPECTIVELY FOR PRODUCING SAID PRODUCTS

(71) Applicant: SHIN-ETSU CHEMICAL CO., LTD., Tokyo (JP)

(72) Inventors: Masami Kaneyoshi, Echizen (JP); Masatoshi Ishii, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 271 days.

(21) Appl. No.: 15/115,580

(22) PCT Filed: Jan. 15, 2015

(86) PCT No.: PCT/JP2015/050906
§ 371 (c)(1),
(2) Date: Jul. 29, 2016

(87) PCT Pub. No.: WO2015/115188
PCT Pub. Date: Aug. 6, 2015

(65) Prior Publication Data
US 2017/0066964 A1    Mar. 9, 2017

(30) Foreign Application Priority Data

Jan. 30, 2014 (JP) .................................. 2014-015619
Nov. 14, 2014 (JP) .................................. 2014-231457

(51) Int. Cl.
*C09K 11/67* (2006.01)
*C09K 11/61* (2006.01)
(Continued)

(52) U.S. Cl.
CPC ........... *C09K 11/675* (2013.01); *B01J 19/088* (2013.01); *C01B 33/10* (2013.01); *C01G 17/006* (2013.01);
(Continued)

(58) Field of Classification Search
CPC ................................................... C09K 11/675
See application file for complete search history.

(56) References Cited

U.S. PATENT DOCUMENTS

| 3,576,756 A | 4/1971 | Russo |
| 7,648,649 B2 | 1/2010 | Radkov et al. |

(Continued)

FOREIGN PATENT DOCUMENTS

| JP | 2009-528429 A | 8/2009 |
| JP | 4582259 B2 | 11/2010 |

(Continued)

OTHER PUBLICATIONS

Kasa. Red and Deep Red Emissions from Cubic K2SiF6:Mn4+ and Hexagonal K2MnF6 Synthesized in HF/KMnO4/KHF2/Si Solutions. Journal of The Electrochemical Society, 159 (4) J89-J95 (2012) (Year: 2012).*

(Continued)

*Primary Examiner* — Matthew E. Hoban
(74) *Attorney, Agent, or Firm* — Birch, Stewart, Kolasch & Birch, LLP (57) ABSTRACT

The present invention relates to a method for producing a hexafluoromanganate(IV), said method being characterized by comprising: inserting an anode and a cathode into a reaction solution that contains a compound containing manganese having an atomic valence of less than 4 and/or manganese having an atomic valence of more than 4 and hydrogen fluoride; and then applying an electric current having an electric current density of 100 to 1000 A/m²

(Continued)

between the anode and the cathode. According to the present invention, it becomes possible to produce a hexafluoromanganate(IV) in which the content ratio of manganese having an atomic valence of 4 is high and the contamination with oxygen is reduced and which has high purity. When a complex fluoride red phosphor is produced using the hexafluoromanganate(IV) as a raw material, the phosphor produced has high luminescence properties, particularly high internal quantum efficiency.

9 Claims, 2 Drawing Sheets (51) Int. Cl.
*B01J 19/08* (2006.01)
*C01G 45/00* (2006.01)
*C01G 45/06* (2006.01)
*C01G 19/00* (2006.01)
*C01G 23/00* (2006.01)
*C01G 25/00* (2006.01)
*C01G 27/00* (2006.01)
*C01B 33/10* (2006.01)
*C01G 17/00* (2006.01)
*C25B 1/24* (2006.01)

(52) U.S. Cl.
CPC ......... *C01G 19/006* (2013.01); *C01G 23/002* (2013.01); *C01G 25/006* (2013.01); *C01G 27/006* (2013.01); *C01G 45/006* (2013.01); *C01G 45/06* (2013.01); *C09K 11/616* (2013.01); *C09K 11/617* (2013.01); *C25B 1/245* (2013.01); *B01J 2219/0809* (2013.01); *B01J 2219/0877* (2013.01); *C01P 2002/50* (2013.01); *C01P 2002/54* (2013.01); *C01P 2002/72* (2013.01); *C01P 2004/51* (2013.01); *C01P 2004/61* (2013.01); *C01P 2006/80* (2013.01)

(56) References Cited

U.S. PATENT DOCUMENTS

| | | |
|---|---|---|
| 2012/0256125 A1 | 10/2012 | Kaneyoshi et al. |
| 2013/0271960 A1 | 10/2013 | Hong et al. |
| 2015/0329770 A1* | 11/2015 | Kaneyoshi ............... B05D 1/18 252/301.36 |

FOREIGN PATENT DOCUMENTS

| | | |
|---|---|---|
| JP | 2012-224536 A | 11/2012 |
| WO | WO 2009/119486 A1 | 10/2009 |
| WO | WO 2014/103932 A1 | 7/2014 |

OTHER PUBLICATIONS

Verstraete. K2MnF6 as a precursor for saturated red fluoride phosphors: the struggle for structural stability. J. Mater. Chem. C, 2017, 5, 10761-10769 (Year: 2017).*
"Inorganic Compound Synthesis III", Shin Jikken Kagaku Kōza 8 [New experimental chemistry series 8] (edited by The Chemical Society of Japan), Maruzen, Inc., 1977, p. 1166.
Bode et al., "About a new synthesis of potassium hexafluoromanganate (IV)", Angew. Chem., vol. 65, 1953, p. 304.
Cox et al., "Complex Fluorides. Part II. Studies on Fluoroferrates and on Hydrogen Bonding in Complex Fluorides", J. Chem. Soc., 1954, pp. 1798-1803.
Hoppe et al., "About fluoromanganates of alkali metals1", Magazine of inorganic and general chemistry, vol. 307, 1961, pp. 276-289.
Huss et al., "Manganese, chromium and vanadium complexes", Magazine of inorganic chemistry, vol. 262, 1950, pp. 25-32.
International Search Report issued in PCT/JP2015/050906, dated Apr. 14, 2015.
Written Opinion of the International Searching Authority issued in PCT/JP2015/050906, dated Apr. 14, 2015.

* cited by examiner

HEXAFLUOROMANGANATE (IV), COMPLEX FLUORIDE PHOSPHOR, AND METHODS RESPECTIVELY FOR PRODUCING SAID PRODUCTS

TECHNICAL FIELD

This invention relates to a hexafluoromanganate(IV) that is an intermediate used in the course of producing phosphors, particularly complex fluoride phosphors, to a complex fluoride phosphor obtained using this intermediate, and to methods for producing these.

BACKGROUND ART

Red-emitting phosphors that are excited by light corresponding to near-UV to blue light-emitting diodes (LEDs) are needed to improve the color rendering properties of white LEDs or, when white LEDs are used as the backlights in liquid crystal displays, to enhance color reproducibility, and are being studied for this purpose. In particular, JP-A 2009-528429 (Patent Document 1) mentions that complex fluoride phosphors obtained by adding manganese to a complex fluoride of the formula $A_2MF_6$ (wherein A is, for example, sodium, potassium or rubidium; and M is, for example, silicon, germanium or titanium) are useful.

Patent Document 1 discloses one method for producing such phosphors wherein a hydrofluoric acid solution in which all of the constituent elements have been dissolved or dispersed is concentrated by evaporation, inducing precipitation. Another production process, disclosed in U.S. Pat. No. 3,576,756 (Patent Document 2), is a method wherein hydrofluoric acid solutions in which the respective constituent elements have been separately dissolved are mixed together, following which the water-soluble organic solvent acetone is added, thereby lowering solubility and inducing precipitation. In addition, JP No. 4582259 (Patent Document 3) discloses a method wherein the element M and the element A in the above formula are each dissolved in separate hydrofluoric acid-containing solutions, manganese is added to either one of these solutions, and the solutions are mixed together, thereby inducing precipitation of the phosphor.

In processes for producing the above known manganese-doped complex fluoride phosphors of the formula $A_2MF_6$ (wherein A is, for example, Na, K or Rb; and M is, for example, Si, Ge or Ti), including in the foregoing literature, the manganese is added in the form of a compound (hexafluoromanganate(IV)) of the formula $A_2MnF_6$ (wherein A is, for example, Na, K or Rb), especially as $K_2MnF_6$, in the phosphor-forming operation. The production of $K_2MnF_6$ by a method discovered by H. Bode et al. (H. Bode, H. Jenssen, F. Bandte: *Angew. Chem.* 65, p. 304 (1953); Non-Patent Document 1), that is, by a method in which an aqueous solution of hydrogen peroxide ($H_2O_2$) is added little by little to a solution obtained by dissolving potassium fluoride (KF) and potassium permanganate ($KMnO_4$) in hydrofluoric acid, has also been reported.

Another known method for producing $A_2MnF_6$ compounds is the method, described by R. Hoppe et al. (R. Hoppe, W. Liebe, W. Daehne: *Z. Anorg. Allg. Chem.* 307, p. 276 (1961); Non-Patent Document 2), of heating a mixture of an alkali metal chloride and anhydrous manganese(II) chloride to about 400° C. in a stream of fluorine gas. In addition, B. Cox et al. (B. Cox, A. G. Sharpe: *J. Chem. Soc.*, p. 1798 (1954); Non-Patent Document 3) state that production can be carried out by inserting a platinum electrode in a manganese(II) fluoride-containing hydrofluoric acid solution and carrying out electrolysis. The production is also cited and discussed in *Shin Jikken Kagaku Kōza* 8 [New experimental chemistry series 8] (edited by The Chemical Society of Japan): "Inorganic Compound Synthesis III," p. 1166 (Maruzen, Inc., 1977); Non-Patent Document 4).

However, the Bode method (Non-Patent Document 1) requires precise control, such as adding hydrogen peroxide little by little and keeping the temperature low, so that the reaction does not proceed to excess, and so carrying this method out industrially is technically demanding. Moreover, when control is inadequate, the quality of the resulting product also is inadequate. As a result, the characteristics of phosphors obtained using this method may be somewhat unsatisfactory. As for the Hoppe method (Non-Patent Document 2), because it uses fluorine gas, which is highly toxic, strongly corrosive and thus dangerous, it would likely require special equipment and facilities to carry out industrially. From this standpoint, the method using electrolysis that is based on the research by Cox et al. (Non-Patent Documents 3, 4) appears to be suitable for industrial use. The inventors, too, have disclosed, in JP-A 2012-224536 (Patent Document 4), the production of complex fluoride phosphors using $K_2MnF_6$ produced by this electrolytic method. However, at the time, they were still investigating the electrolytic reaction conditions that affect the quality of the $K_2MnF_6$ and of the phosphors produced using this.

SUMMARY OF THE INVENTION

Problems to be Solved by the Invention

Accordingly, this invention, which was arrived at in view of the above circumstances, has the following objects: to provide a hexafluoromanganate(IV) that, when used as the precursor (intermediate) for a complex fluoride phosphor, is able to improve the emission characteristics of the phosphor, and that can be described in particular by the formula $A_2MnF_6$ (wherein A is, for example, Na, K or Rb); to provide a complex fluoride phosphor obtained using this hexafluoromanganate(IV); and to provide methods for producing these.

Means for Solving the Problems

The inventors believe that, depending on the conditions of the electrolytic reaction, differences arise in the oxidation state and uniformity of the resulting manganese compound. As a result, they have conducted extensive investigations on the reaction conditions such as current density, ultimately arriving at the present invention.

Accordingly, the invention provides the following hexafluoromanganate(IV), complex fluoride phosphor, and methods for producing these.

[1] A method for producing hexafluoromanganate(IV), comprising the steps of: inserting an anode and a cathode into a reaction liquid that includes a compound containing manganese having a valence of less than 4 and/or more than 4 and hydrogen fluoride; and passing an electrical current between the anode and cathode at a current density of from 100 to 1,000 A/m².

[2] The production method of [1], wherein a reactor in which the reaction liquid is placed is partitioned with a diaphragm into a first chamber for use as an anode chamber in which the anode is inserted and a second chamber for use as a cathode chamber in which the cathode is inserted, and current is passed between the anode and cathode.

[3] The production method of [2], wherein a reaction liquid that includes a compound containing manganese having a valence of less than 4 and hydrogen fluoride is placed in the anode chamber, and a solution that includes hydrogen fluoride and does not include manganese is placed in the cathode chamber.

[4] The production method of [2], wherein a reaction liquid that includes a compound containing manganese having a valence greater than 4 and hydrogen fluoride is placed in the cathode chamber, and a solution that includes hydrogen fluoride and does not include manganese is placed in the anode chamber.

[5] The production method of [2], wherein a reaction liquid that includes a compound containing manganese having a valence of less than 4 and hydrogen fluoride is placed in the anode chamber, and a reaction liquid that includes a compound containing manganese having a valence greater than 4 and hydrogen fluoride is placed in the cathode chamber.

[6] The production method of any one of [2] to [5], wherein the diaphragm is an ion-exchange membrane.

[7] The production method of any one of [1] to [6], wherein the electrical current is direct current.

[8] The production method of any one of [1] to [7], wherein an alkali metal fluoride or hydrogenfluoride represented by the formula (1):

$$AF \text{ or } AHF_2 \qquad (1)$$

wherein A is one or more alkali metal element selected from the group consisting of lithium, sodium, potassium, rubidium and cesium, and includes at least sodium or potassium, is added to the reaction liquid at any reaction stage from beginning to end such that a hexafluoromanganese(IV) alkali metal salt represented by the formula (2):

$$A_2MnF_6 \qquad (2)$$

wherein A is as defined above, precipitates within the reaction liquid and is recovered.

[9] A hexafluoromanganate(IV) having a oxygen content at outermost wherein the oxygen content is 1 atomic % or less.

[10] A method for producing a complex fluoride phosphor represented by the formula (3):

$$A_2MF_6:Mn \qquad (3)$$

wherein A is one or more alkali metal element selected from the group consisting of lithium, sodium, potassium, rubidium and cesium, and includes at least sodium or potassium, and M is one or more element selected from the group consisting of silicon, titanium, zirconium, hafnium, germanium and tin, comprising the steps of mixing a hexafluoromanganate(IV) obtained by the production method of any one of [1] to [8] together with an element A-containing compound and an element M-containing compound, wherein A and M are as defined above, in the presence of hydrogen fluoride.

[11] A complex fluoride phosphor represented by the formula (3):

$$A_2MF_6:Mn \qquad (3),$$

wherein A is one or more alkali metal element selected from the group consisting of lithium, sodium, potassium, rubidium and cesium, and includes at least sodium or potassium, and M is one or more element selected from the group consisting of silicon, titanium, zirconium, hafnium, germanium and tin, and wherein the complex fluoride phosphor has a oxygen content at outermost, and the oxygen content is 1 atomic % or less.

Advantageous Effects of the Invention

This invention makes it possible to obtain high-purity hexafluoromanganates(IV) which have a high proportion of manganese with a valence of 4 and are minimally contaminated with oxygen and other impurities. By using these as the precursors to produce complex fluoride red phosphors, it is possible to obtain phosphors endowed with high emission characteristics, particularly a high internal quantum efficiency.

BRIEF DESCRIPTION OF THE DIAGRAMS

FIG. 1 shows schematic views of the construction of a two-chamber reactor used in the invention, with (a) being a plan view and (b) being a front view.

EMBODIMENT FOR CARRYING OUT THE INVENTION

Embodiments of the inventive method for producing hexafluoromanganate(IV) are described below.

Manganese-activated complex fluoride phosphors emit red light because manganese as a constituent element has a valence of 4 (i.e., it is $Mn^{4+}$). So it is regarded as desirable to fabricate such phosphors using a compound made of $Mn^{4+}$. For this reason, and also because they are fluorides, hexafluoromanganates(IV) have hitherto been used as precursors for the production of complex fluoride phosphors. The only commonly available tetravalent Mn compound is manganese oxide ($MnO_2$). However, it is difficult to dissolve $MnO_2$ with maintaining its tetravalent state. Thus, manganese compound which is commonly available and can exist as tetravalent manganese when the manganese compound is dissolved in solution is substantially nonexistent. As a result, it is necessary to convert manganese to a tetravalent state (i.e., to $Mn^{4+}$) by an oxidation or reduction reaction from manganese having another atomic valence state. A distinctive feature of this invention is to carry out such an oxidation or reduction reaction by applying a voltage across electrodes within a given solution containing a dissolved manganese compound so that an electrical current passes through the solution.

That is, the inventive method for producing a hexafluoromanganate(IV) includes the steps of inserting an anode and a cathode into a reaction liquid that includes a compound containing manganese having a valence of less than 4 and/or more than 4 and hydrogen fluoride; and passing an electrical current between the anode and cathode at a current density of from 100 to 1,000 A/m².

Any of the following may be used here as the source of manganese: manganese compounds that at least partially dissolve in a hydrofluoric acid solution to form a divalent or trivalent state, such as manganese(II) fluoride, manganese (II) carbonate, metallic manganese and manganese(II, III) oxide hydroxide; and manganese compounds in a hexavalent or heptavalent state, such as potassium permanganate and sodium permanganate. The manganese compound completely dissolves in the reaction liquid to form a solution, or does not completely dissolve in the reaction liquid and is included in part as slurry. The amount of manganese within the reaction solution may be set in the range of 0.05 to 5 mol/L, preferably 0.1 to 3 mol/L, and more preferably 0.2 to 2 mol/L. At less than 0.05 mol/L, not only is the reaction efficiency poor, because this concentration falls within the solubility range, precipitation and recovery of the product may not be possible. At a high concentration greater than 5 mol/L, complete dissolution may not occur during the reaction.

It is essential for hydrogen fluoride to be present in the reaction solution. If, when the manganese has become tetravalent, it separates out as manganese(IV) oxide, it will remain behind in this state, which is undesirable. To prevent this from happening, it is necessary both that there be sufficient fluoride ions in the liquid and that the liquid be acidic. The fluoride ion concentration is preferably at least 1 mol/L, and more preferably at least 3 mol/L. There is no particular upper limit in the fluoride ion concentration, although this is generally 30 mol/L or less, and especially 20 mol/L or less. The acid ($H^+$) concentration is preferably at least 0.1 mol/L, and more preferably at least 0.5 mol/L. There is no particular upper limit in the acid concentration, although this is generally 30 mol/L or less, and especially 15 mol/L or less. This condition is satisfied when the hydrofluoric acid concentration is 5 wt % or more.

It is essential for the electrical current to have a current density at the electrode surface of from 100 to 1,000 A/m$^2$. At less than 100 A/m$^2$, the driving force of the reaction is inadequate and the reaction does not proceed, as a result of which contamination by non-tetravalent manganese compounds may occur. A current density above 1,000 A/m$^2$ is undesirable because heat generation increases and the voltage needed to pass this much current rises. The current density is more preferably from 200 to 700 A/m$^2$.

Causing the reaction liquid to flow during the reaction is essential for the successive supply of reactants to the electrode surfaces. Any suitable method may be used to cause the reaction liquid to flow, such as stirring with a motor and mixing blades, drawing off a portion of the solution and returning it by circulation with a pump, or continuously running the solution over the electrode surfaces.

Here, the method of carrying out the reaction may consist only of inserting an anode and a cathode into a reaction liquid within a reactor, and passing an electrical current between the anode and cathode. By doing so, manganese compounds having a valence smaller than 4, such as manganese(II) and manganese(III) compounds, are oxidized, resulting in the formation of hexafluoromanganate(IV) near the anode, and manganese compounds having a valence greater than 4, such as manganese(VI) and manganese(VII) compounds, are reduced, resulting in the formation of hexafluoromanganate(IV) near the cathode. However, in a more preferred method, as shown in FIG. 1, it is desirable to carry out the reaction using an apparatus having a reactor 10 partitioned at the interior with a diaphragm 11 into an anode chamber 12a in which the anode 13a is inserted and a cathode chamber 12b in which the cathode 13b is inserted.

In this case, the method used may be any of the following: a method which places a reaction liquid that includes a compound containing manganese having a valence of less than 4 and hydrogen fluoride in the anode chamber, places a solution that includes hydrogen fluoride and does not include manganese in the cathode chamber, and carries out the reaction; a method which places a reaction liquid that includes a compound containing manganese having a valence greater than 4 and hydrogen fluoride in the cathode chamber, places a solution that includes hydrogen fluoride and does not include manganese in the anode chamber, and carries out the reaction; or a method which places a reaction liquid that includes a compound containing manganese having a valence of less than 4 and hydrogen fluoride in the anode chamber, places a reaction liquid that includes a compound containing manganese having a valence greater than 4 and hydrogen fluoride in the cathode chamber, and carries out the reaction.

Figure 1A:
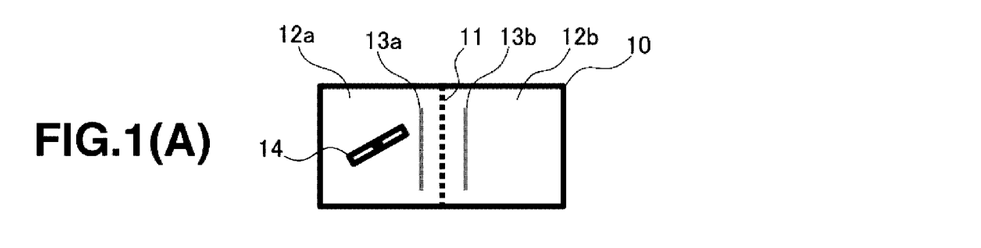
Figure 1B:
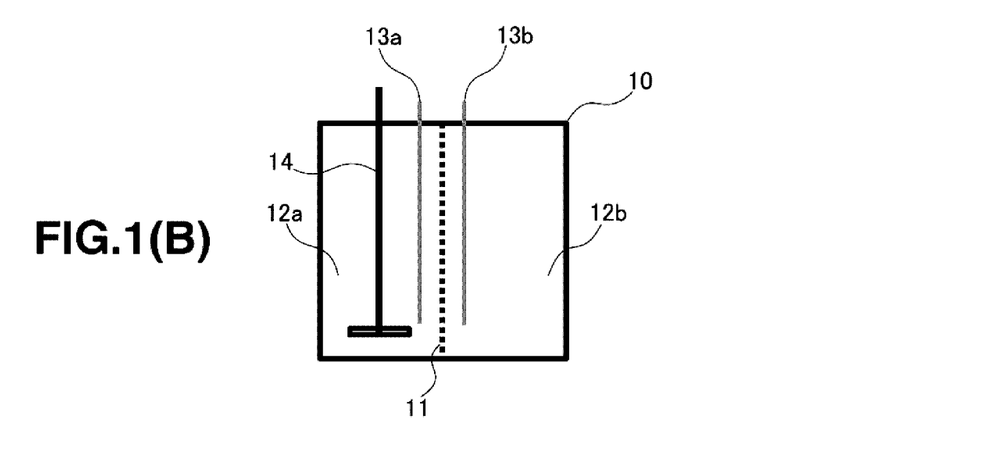

In FIG. 1, the cathode chamber 12a is equipped with a stirrer 14, although the invention is not limited in this respect. It is preferable for a stirrer to be provided in at least the chamber in which the reaction liquid is to be placed, although both chambers may be equipped with a stirrer.

It is preferable to use an ion-exchange membrane as the diaphragm. Even though the liquid is separated by a diaphragm, because it is essential for an electrical current to flow between the electrodes on either side of the diaphragm, ion movement should be possible. Of ion-exchange membranes, cation-exchange membranes made of a fluoropolymer having sulfonic acid groups introduced thereon are preferred because they have a high corrosion resistance in hydrofluoric acid-containing liquids, and because they are selectively permeable to monovalent cations and do not readily allow manganese ions to pass through. Advantageous use can be made of, for example, various types of Nafion membranes from E.I. DuPont de Nemours & Co., and Selemion (e.g., DMV) from Asahi Glass Co., Ltd.

The electrical current flowing through the reaction system may be, for example, direct current, two-phase alternating current or three-phase alternating current, although direct current is preferred. In combination with the diaphragm mentioned above, it is possible to have the electrode inserted into one of the chambers divided by the diaphragm be the anode, and the electrode inserted into the other chamber be the cathode. That is, by adding a manganese compound having a higher than tetravalent oxidation state, such as potassium permanganate, to the solution in the chamber where the cathode is located, or by adding manganese(II) fluoride to the solution in the chamber where the anode is located, the reaction can be efficiently carried out.

The length of time during which electrical current is passed through the system is balanced with the current. It is preferable to pass current for the length of time required to pass an amount of electricity equivalent to at least 1.5 F (F being the Faraday constant=96,500 C) per mole of manganese (time (s)=amount of electricity (C)/current (A)). The amount of electricity passed is more preferably at least 2 F per mole of manganese. There is no upper limit, although the amount of electricity passed is preferably not more than 15 F, and more preferably not more than 10 F, per mole of manganese.

Here, an alkali metal fluoride or hydrogenfluoride represented by the formula (1) below:

$$AF \text{ or } AHF_2 \tag{1}$$

(wherein A is one more alkali metal element selected from the group consisting of Li, Na, K, Rb, and Cs, and includes at least Na or K) may be added at any stage of the reaction from beginning to end such that a hexafluoromanganese(IV) alkali metal salt represented by the formula (2) below:

$$A_2MnF_6 \tag{2}$$

(wherein A is as defined above) precipitates within the reaction liquid and is recovered. The alkali metal salt used in this case may be, for example, sodium fluoride, potassium fluoride, sodium hydrogenfluoride or potassium hydrogenfluoride. The amount added is set so that the total amount of alkali metal per mole of manganese is at least 2 moles, and preferably at least 4 moles. The upper limit is preferably, but not necessarily, 10 moles or less. The concentration is preferably from 0.2 to 5 mol/L. As for the timing of such addition, this alkali metal may be added at any time from the beginning to the end of the reaction.

Moreover, in this invention, using a first solution containing a compound such as a fluoride of a tetravalent element M (M being one or more element selected from among Si, Ti, Zr, Hf, Ge and Sn), and using a second solution containing a compound such as a fluoride, hydrogenfluoride, nitrate, sulfate, hydrogensulfate, carbonate, bicarbonate or hydroxide of an alkali metal A (A being one or more alkali metal selected from among Li, Na, K, Rb and Cs) and/or a solid of this alkali metal A compound, a complex fluoride red phosphor represented by the formula (3) below:

$$A_2MF_6:Mn \quad (3)$$

(wherein M is one or more tetravalent element selected from among Si, Ti, Zr, Hf, Ge and Sn; and A is one or more alkali metal selected from among Li, Na, K, Rb and Cs, and includes at least Na and/or K) can be produced by adding the hexafluoromanganate(IV) prepared as described above to either of, or both, the first solution and the second solution and/or solid, then mixing together the first solution with the second solution and/or solid.

The hexafluoromanganate (IV) $A_2MnF_6$ obtained by this method has a low oxygen content at outermost (near-surface) which is 1 atomic % or less, and especially 0.5 atomic % or less.

The complex fluoride phosphor $A_2MF_6$:Mn obtained from this hexafluoromanganate(IV) also has a low oxygen content, the near-surface oxygen content being 1 atomic % or less, preferably 0.8 atomic % or less, and especially 0.7 atomic % or less.

The near-surface oxygen content here is measured by, for example, x-ray photoelectron spectroscopy. With this method, depending on the conditions, the level of oxygen within a substance to a thickness of about 2 to 10 nm from the surfacemost portion is measured.

The phosphor obtained in this way contains little oxygen as an impurity, and thus has high emission characteristics, especially a high internal quantum efficiency.

EXAMPLES

The invention is illustrated more fully below by way of Examples and Comparative Examples, although these Examples are not intended to limit the invention.

Example A1

A slurry was prepared by adding $MnCO_3$ (manganese(II) carbonate n-hydrate, Wako guaranteed reagent), in an amount of 36.8 g (corresponding to 0.3 mol of Mn), little by little and under stirring to a mixture of 307 cm³ of 50 wt % hydrofluoric acid (SA-X, available from Stella Chemifa Corporation; referred to below as "50% HF") and 70 cm³ of pure water that had been placed in an approximately 700 cm³ polyethylene beaker equipped with a stirrer.

Next, two platinum sheet electrodes, each having a liquid contact surface area of about 25 cm², were attached to the beaker at an interval of about 5 cm and connected by wire to a direct-current power supply. Setting the current value to a constant current of 1.2 A, a voltage was applied across the two electrodes and current was continuously supplied for ten hours under stirring. The voltage changed from an initial value of 2.2 V to 2.6 V. The current density for the opposing anode-cathode pair was 1.2 A÷0.0025 m²=480 A/m², and the amount of electricity that passed through up to this time was calculated as equivalent to 43,200 C=0.448 F.

The electricity was then temporarily turned off and 86 g of potassium hydrogenfluoride ($KHF_2$, from Stella Chemifa Corporation; referred to below as "$KHF_2$") was added. Under continued stirring, an electrical current was again passed through continuously at a constant current of 1.2 A for 7 hours, in the course of which a yellow precipitate formed in the liquid that had became a dark brown solution. The voltage which was 2.8 V at the time of potassium fluoride addition changed to 3.4 V.

Figure 2:
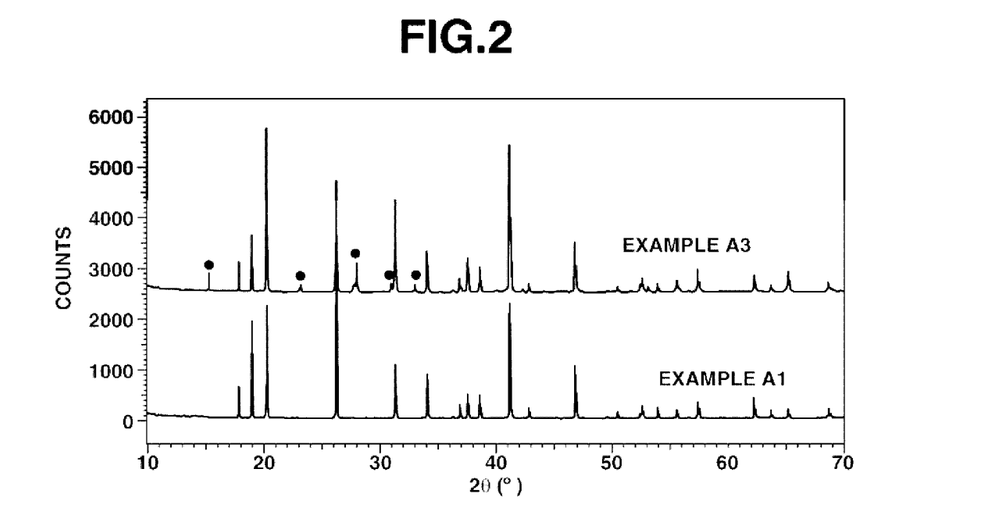
FIG. 2 shows x-ray diffraction patterns for the powders obtained in Examples A1 and A3.

The liquid within the beaker was drawn off and the precipitate that had formed was separated off by filtration with a Büchner funnel, washed with acetone and then vacuum dried, giving 13.1 g of product. In identification by powder x-ray diffraction, the results agreed with the peak pattern for $K_2MnF_6$ in International Centre for Diffraction Data (ICDD) powder x-ray diffraction database PDF01-077-2133 (FIG. 2).

Example A2

Aside from changing the power supply from the direct current used in Example A1 to two-phase alternating current (60 Hz sine wave), the same starting materials were charged as in Example A1 and the same setup was used. The current was set so as to be 1.2 A at the waveform maximum. As in Example A1, 86 g of $KHF_2$ was added at the 10-hour point and current was passed through for another 7 hours. The precipitate was separated off in the same way as in Example A1, giving 9.8 g of product. In identification by powder x-ray diffraction, the results agreed with the peak pattern for $K_2MnF_6$ in ICDD powder x-ray diffraction database PDF01-077-2133.

Example A3

A rectangular two-chamber electrolytic cell (reactor) made of clear polyvinyl chloride in which an ion-exchange membrane (Nafion N-324, from Du Pont KK) was used as the diaphragm 11 was furnished (shown in FIG. 1).

A slurry was prepared by adding potassium permanganate (guaranteed reagent from Kanto Chemical Co., Ltd.; $KMnO_4$), in an amount of 28.4 g (corresponding to 0.18 mol of Mn), little by little and under stirring to a mixture of 200 cm³ of 50% HF and 150 cm³ of pure water. The slurry was poured into one chamber 12b of the electrolytic cell in FIG. 1, a stirrer 14 was set in place, and stirring was begun. In addition, 18.8 g of $KHF_2$ was added thereto and dissolved.

Also, 220 cm³ of 50% HF and 120 cm³ of pure water were mixed together and 14.0 g of $KHF_2$ was dissolved therein to form a solution, and the solution was poured into the other chamber 12a that does not contain slurry.

Platinum sheet electrodes 13a and 13b, each having a liquid contact surface area of about 50 cm², were attached to, respectively, chambers 12a and 12b so as to face each other across a diaphragm 11 therebetween, and connected by wire to a direct-current power supply. With the slurry-containing side (electrode 13b) serving as the cathode (−), and the solution-containing side (electrode 13a) serving as the anode (+), the current value was set to a constant current of 2.4 A and current was continuously passed through for 8 hours while stirring the slurry in the cathode chamber 12b. The voltage changed from an initial value of 3.5 V to 4.5 V. The current density calculated in the same way as in Example A1 was 480 A/m², and the amount of electricity that had passed through up to this time was calculated to be 69,120 C=0.716

F. A yellow to brown precipitate had formed in the cathode chamber 12b. The liquid in the cathode chamber 12b was drawn off and the precipitate that had formed was separated off by filtration with a Büchner funnel, washed with acetone and then vacuum dried, giving 11.9 g of product. Identification by powder x-ray diffraction showed primarily, as in Example A1, a group of peaks for $K_2MnF_6$, although the slight presence of $KMnF_4$ peaks in ICDD powder x-ray diffraction database PDF01-079-2380 was observed. FIG. 2 shows this x-ray diffraction pattern together with that for Example A1. The peaks marked with closed bullets represent $KMnF_4$.

Example A4

Aside from setting the amount of potassium permanganate to 14.2 g (corresponding to 0.09 mole of Mn), a manganese solution was prepared using the same amount of materials (200 cm$^3$ of 50% HF and 150 cm$^3$ of pure water) as in Example A3. This solution was charged into one chamber 12b of the same electrolytic cell 10 as in Example A3.

A slurry was prepared by adding 27.6 g of $MnCO_3$ (corresponding to 0.225 mol of Mn) to 300 cm$^3$ of 50% HF and 70 cm$^3$ of pure water, and the slurry was charged into the chamber 12a on the side opposite from that containing the potassium permanganate solution.

Platinum sheet electrodes 13a and 13b like those in Example A3 were attached to, respectively, chambers 12a and 12b with a diaphragm 11 therebetween, and connected by wire to a direct-current power supply. With the slurry-containing side (electrode 13a) serving as the anode (+) and the potassium permanganate solution-containing side (electrode 13b) serving as the anode (−), the current value was set to a constant current of 2.4 A, a stirrer was set in chamber 12b as well, and current was passed through for 5 hours while continuously stirring the liquids in both electrode chambers. The voltage changed from an initial value of 2.6 V to 3.4 V. The current density calculated in the same way as in Example A1 was 480 A/m$^2$, and the amount of electricity that had passed through up to this point was calculated to be 43,200 C=0.448 F.

At this point, the electricity was temporarily turned off and 45 g of potassium hydrogenfluoride $KHF_2$ was added to each anode chamber 12a and cathode chamber 12b. While continuing to stir, an electrical current was again passed through continuously at a constant current of 2.4 A for 5 hours, in the course of which a yellow precipitate formed in the anode chamber 12a where the solution had become dark brown in color. A yellowish-brown precipitate formed in the cathode chamber 12b as well. The voltage which was 3.6 V at the time of potassium fluoride addition changed to 4.0 V.

The liquids within both chambers were drawn off and the precipitates that had formed were separated off by filtration with Büchner funnels, washed with acetone and then vacuum dried, giving two products. One product in an amount of 47.9 g was obtained from the anode chamber 12a, and another product in an amount of 6.1 g was obtained from the cathode chamber 12b. Identification by powder x-ray diffraction showed that the product from the anode chamber was the same as that in Example A1, and the product from the cathode chamber was the same as that in Example A3.

Example A5

A rectangular two-chamber electrolytic cell (reactor) made of clear polyvinyl chloride (FIG. 1) like that in Example A3 was used.

A slurry was prepared by adding 8.5 g of $MnCO_3$ (corresponding to 0.15 mole of Mn) little by little and under stirring to a mixture of 307 cm$^3$ of 50% HF and 70 cm$^3$ of pure water. The slurry was poured into one chamber 12a in the electrolytic cell 10, a stirrer 14 was set therein, and stirring was begun.

Also, a solution was prepared by mixing together 220 cm$^3$ of 50% HF and 120 cm$^3$ of pure water, and the solution was poured into the other chamber 12b which contained no slurry.

Platinum sheet electrodes 13a and 13b identical to those in Example A1 were attached to, respectively, chambers 12a and 12b with a diaphragm 11 therebetween, and connected by wire to a direct-current power supply. With the slurry-containing side (electrode 13a) serving as the anode (+), and the solution-containing side (electrode 13b) serving as the cathode (−), the current value was set to a constant current of 1.6 A and current was passed through continuously for 8 hours while stirring the slurry in the anode chamber 12a. The voltage changed from an initial value of 2.5 V to 3.0 V. The current density calculated in the same way as in Example A1 was 640 A/m$^2$, and the amount of electricity that had passed through up to this point was calculated to be 28,800 C=0.298 F.

Figure 3:
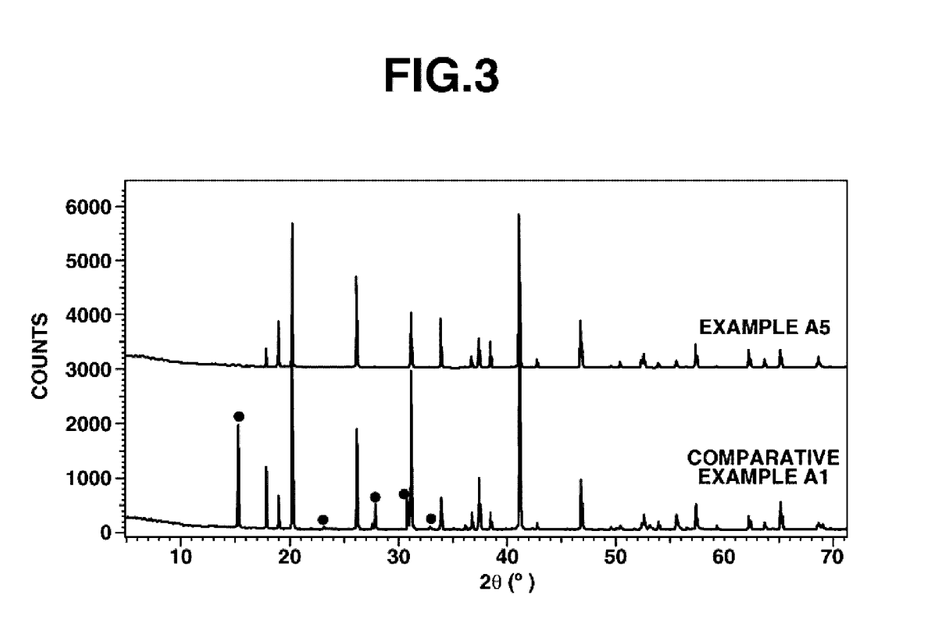
FIG. 3 shows x-ray-diffraction patterns for the powders obtained in Example A5 and Comparative Example A1.

At this point, the electricity was turned off, and the liquid in the anode chamber 12a was drawn off and transferred to a polyethylene beaker. A solution obtained by dissolving 43.6 g of potassium fluoride (anhydrous potassium fluoride from Stella Chemifa Corporation; KF) in 50 cm$^3$ of 50% HF was added thereto under stirring, after which stirring was continued for another 20 minutes. Because a yellow precipitate had formed, this was separated off by filtration with a Büchner funnel, washed with acetone and then vacuum dried, giving 21.1 g of the product. Identification by powder x-ray diffraction showed results that matched the peak pattern for $K_2MnF_6$ in ICDD powder x-ray diffraction database PDF01-077-2133 (FIG. 3).

Example A6

A rectangular two-chamber electrolytic cell made of clear polyvinyl chloride (FIG. 1) like that used in Example A3 was used.

The same slurry as in Example 1 was prepared. This slurry was poured into one chamber 12a in the electrolytic cell 10, a stirrer 14 was set therein, and stirring was begun.

A solution was prepared by mixing together 220 cm$^3$ of 50% HF and 120 cm$^3$ of pure water, and the solution was poured into the other chamber 12b which contained no slurry.

Platinum sheet electrodes 13a and 13b, each having a surface area of about 50 cm$^2$, were attached to, respectively, chambers 12a and 12b with a diaphragm 11 therebetween, and connected by wire to a direct-current power supply. With the slurry-containing side (electrode 13a) serving as the anode (+), and the solution-containing side (electrode 13b) serving as the cathode (−), the current value was set to a constant current of 2.4 A and current was passed through continuously for 5 hours while stirring the slurry in the cathode chamber 12a. The voltage changed from an initial value of 2.5 V to 3.3 V. The current density calculated in the same way as in Example A1 was 480 A/m$^2$, and the amount of electricity that had passed through up to this point was calculated to be 43,200 C=0.448 F.

At this point, the electricity was temporarily turned off, and potassium hydrogenfluoride $KHF_2$ was added to the anode chamber 12a in an amount of 86 g and to the cathode chamber 12b in an amount of 42 g. Under continued stirring, an electrical current was again passed through continuously at a constant current of 2.4 A for 5 hours, in the course of which a yellow precipitate formed in the liquid that had became a dark brown solution. The voltage which was 3.6 V at the time of $KHF_2$ addition changed to 4 V.

The liquid in the cathode chamber 12a was drawn off and the precipitate that had formed was separated off by filtration with a Büchner funnel, washed with acetone and then vacuum dried, giving 66.1 g of the product. Identification by powder x-ray diffraction showed the same peak pattern as in Example A5.

Example A7

Liquids were prepared from the same amounts of starting materials as in Example A6, and were charged into the anode chamber 12a and the cathode chamber 12b in the same way as in Example A6. The current value was set to a constant current of 3.6 A, thereby effecting dissolution in the same way as in Example A1. The voltage changed from an initial value of 3.0 V to 3.8 V. At this point, the electricity was temporarily turned off, and the same amounts of potassium hydrogenfluoride $KHF_2$ were added to the respective chambers 12a and 12b as in Example A6. Under continued stirring, an electrical current was again passed through continuously at a constant current of 3.6 A for 5 hours. The voltage which was 4.6 V at the time of potassium hydrogenfluoride addition changed to 5.1 V. The current density calculated in the same way as in Example A1 was 720 A/m$^2$, and the amount of electricity that had passed through, both before and after potassium hydrogenfluoride addition, was calculated to be 64,800 C=0.672 F. Because the reaction liquid temperature had risen to about 50° C., this was allowed to cool to about 30° C. and then separated off by filtration and treated in the same way as in Example A1, giving 59.7 g of product. Identification by powder x-ray diffraction showed the same peak pattern as in Example A1.

Example A8

Using a polyethylene beaker within a hood, 31.7 g (0.16 mole) of manganese chloride ($MnCl_2 \cdot 4H_2O$, guaranteed reagent from Wako Pure Chemical Industries) was dissolved in 250 cm$^3$ of 50% HF and 50 cm$^3$ of pure water. To this was added, little by little and under stirring, 19.6 g (0.12 mole) of potassium permanganate ($KMnO_4$, guaranteed reagent from Wako Pure Chemicals) as a solid. Foaming occurred and a yellow gas believed to be $Cl_2$ formed. The reaction was continued for about 40 minutes following the end of addition.

In a separate operation, a concentrated KF solution was prepared by dissolving 93.0 g of KF in 100 cm$^3$ of 50% HF. This KF solution was added to the above reaction mixture, whereupon a pink precipitate formed. This was separated off by filtration with a Büchner funnel. The filtrate was recovered prior to rinsing. The precipitate on the Büchner funnel was washed, first with a small amount of tetrahydrofuran, then with acetone, and air-dried overnight in a hood. The product was weighed the following morning, and found to be 41.4 g. Some of this product was used to measure the powder x-ray diffraction pattern, whereupon the results matched the pattern for $K_2MnF_5(H_2O)$ in ICDD powder x-ray diffraction database PDF01-074-0446.

This pink product and 300 cm$^3$ of the filtrate recovered the previous day were placed in one chamber 12a of the same electrolytic cell 10 as in Example A3, and stirring was begun. The other chamber 12b was charged with 70 g of KF, 200 cm$^3$ of 50% HF and 100 cm$^3$ of pure water.

Platinum sheet electrodes 13a and 13b, each having a surface area of about 50 cm$^2$, were attached to, respectively, chambers 12a and 12b with a diaphragm 11 therebetween, and connected by wire to a direct-current power supply. With the side charged with the pink precipitate-containing slurry (electrode 13a) serving as the anode (+), and the solution-containing side (electrode 13b) serving as the cathode (−), the current value was set to a constant current of 1.35 A and current was passed through continuously for 9 hours while stirring the slurry in the cathode chamber 12a. The voltage changed from an initial value of 2.0 V to 2.5 V. The current density calculated in the same way as in Example A1 was 270 A/m$^2$, and the amount of electricity that had passed through up to this point was calculated to be 43,740 C=0.453 F.

At this point, the electricity was temporarily turned off and potassium hydrogenfluoride $KHF_2$ was added to the anode chamber 12a in an amount of 86 g and to the cathode chamber 12b in an amount of 42 g. While continuing to stir, an electrical current was again passed through continuously at a constant current of 1.2 A for 5 hours, in the course of which a yellow precipitate formed in the anode chamber 12a where the reaction liquid had became a dark brown solution. The voltage which was 3.6 V at the time of potassium hydrogenfluoride addition changed to 4 V.

The solution in the cathode chamber 12a was drawn off and the precipitate that had formed was separated off by filtration with a Büchner funnel, washed with acetone and then vacuum dried, giving 29.7 g of the product. Identification by powder x-ray diffraction showed the same peak pattern as in Example A1.

Example A9

After carrying out an electrolytic reaction in the same way as in Example A5, a liquid prepared by the mixture (and partial dissolution) of 31.5 g of sodium fluoride (anhydrous sodium fluoride from Stella Chemifa Corporation; NaF) instead of potassium fluoride in 70 cm$^3$ of 50% HF was added under stirring; following addition, stirring was continued for another 20 minutes. Because a yellow precipitate had formed, this was separated off with a Büchner funnel, washed with acetone, and vacuum dried, giving 18.3 g of product.

Comparative Example A1

$K_2MnF_6$ was prepared by the following method, in general accordance with the method described by H. Bode, H. Jenssen and F. Bandte in *Angew. Chem.* 65, p. 304 (1953) (Non-Patent Document 1).

A mixture of 560 cm$^3$ of 50% HF and 76 cm$^3$ of pure water was prepared in a polyethylene beaker, and KF (133.9 g) and $KMnO_4$ were dissolved therein under stirring with a magnetic stirrer. Prior to the next reaction, the beaker containing this solution was placed in a dish containing ice water to which sodium chloride had been added, and stirring was continued under cooling. Next, 13 cm$^3$ of hydrogen peroxide water (34% $H_2O_2$ from Wako Pure Chemicals Industry, Ltd., electronics grade) was slowly added dropwise. The temperature of the liquid during reaction was maintained at about 3° C. The color of the liquid during addition of the hydrogen peroxide water changed from red-violet to brown and a yellowish-brown precipitate gradually formed. This precipitate was separated off by filtration, washed with acetone and vacuum dried, giving 13.2 g of product. Identification by powder x-ray diffraction showed primarily a group of peaks for $K_2MnF_6$ similar to Example A5, although $KMnF_4$ peaks of substantial strength were also observed. FIG. 3 shows the x-ray diffraction pattern together with that for Example A5. The peaks marked with closed bullets represent $KMnF_4$.

Comparative Example A2

A rectangular two-chamber electrolytic cell made of clear polyvinyl chloride like that used in Example A3 was used (FIG. 2).

A slurry was prepared by adding 8.5 g of $MnCO_3$ (corresponding to 0.15 mole of Mn), little by little and under stirring, to a mixture of 307 cm³ of 50% HF and 70 cm³ of pure water. The slurry was poured into one of the chambers of the electrolytic cell, a stirrer was set therein, and stirring was begun.

Also, a solution was prepared by mixing together 220 cm³ of 50% HF and 120 cm³ of pure water, and this was poured into the other chamber which contained no slurry.

Platinum sheet electrodes, each having a surface area of 100 cm³, were attached to both sides with a diaphragm therebetween, and connected by wire to a direct-current power supply. With the slurry-containing side serving as the anode (+), and the solution-containing side serving as the cathode (−), the current value was set to a constant current of 0.7 A and current was passed through continuously for 6 hours while stirring the slurry in the anode chamber. The voltage changed from an initial value of 2.1 V to 2.3 V. The current density calculated in the same way as in Example A1 was 70 A/m², and the amount of electricity that had passed through up to this point was calculated to be 15,120 C=0.157 F.

At this point, the electricity was turned off, and the liquid in the anode chamber was drawn off and transferred to a polyethylene beaker. A solution obtained by dissolving 43.6 g of potassium fluoride (anhydrous potassium fluoride from Stella Chemifa Corporation; KF) in 50 cm³ of 50% HF was added thereto under stirring, after which stirring was continued for another 20 minutes. A yellow precipitate had formed, and so this was separated off by filtration with a Büchner funnel, washed with acetone and then vacuum dried, giving 20.3 g of the product. Identification by powder x-ray diffraction showed the same pattern as in Comparative Example 1.

The near-surface oxygen levels of the hexafluoromanganates(IV) obtained in Examples A1, A3, A5 and A7 and Comparative Examples A1 and A2 were analyzed using an AXIS-HIS x-ray photoelectron spectrometer (Shimadzu Kratos KK). The results are shown in Table 1.

The measurement conditions were as follows.
X-ray source: Mg Kα line
Output: 150 W
Measured surface area: 200×600 μm
Path energy: 80 eV
Charge neutralization: e⁻
Take-off angle: 90°

TABLE 1

| | Oxygen level (atomic %) |
|---|---|
| Example A1 | 0.12 |
| Example A3 | 0.18 |
| Example A5 | 0.11 |

TABLE 1-continued

| | Oxygen level (atomic %) |
|---|---|
| Example A7 | 0.35 |
| Comparative Example A1 | 5.2 |
| Comparative Example A2 | 2.8 |

Example B1

A Si—F—Mn solution was prepared by first mixing 46.8 cm³ of an aqueous solution of fluorosilicic acid ($H_2SiF_6$) (Morita Chemical Industries Co., Ltd.) with 532 cm³ of 50% HF, then adding thereto 2.66 g of the $K_2MnF_6$ powder prepared in Example A1 and dissolving the powder under stirring.

In a separate operation, a KF solution was prepared by mixing 42.1 g of $KHF_2$ together with 136 cm³ of 50% HF and 254 cm³ of pure water to effect dissolution.

While stirring the Si—F—Mn solution, the KF solution was added little by little, whereupon a light orange-colored precipitate formed. The precipitate was separated off by filtration with a Büchner funnel, and was drained of liquid as much as possible. Next, it was washed with acetone, drained and vacuum dried, giving 36.6 g of the powder product $K_2SiF_6$:Mn.

The particle size distribution of the powder product thus obtained was measured with a flow dispersion-type laser diffraction particle size analyzer (Helos and Rodos, from Sympatec GmbH). As a result, particles having a size of 8.4 μm or less accounted for 10% of the total volume ($D_{10}$=8.4 μm), particles having a size of 19.2 μm or less accounted for 50% of the total volume ($D_{50}$=19.2 μm), and particles having a size of 29.3 μm or less accounted for 90% of the total volume ($D_{90}$=29.3 μm).

Example B2

A Si—F—Mn solution was prepared by mixing 42.2 cm³ of the same fluorosilicic acid as in Example B1 with 532 cm³ of 50% HF, then adding 2.40 g of the $K_2MnF_6$ powder prepared in Example A1 and dissolving the powder under stirring.

In a separate operation, a KF solution was prepared by dissolving 28.2 g of KF in 286 cm³ of pure water.

While stirring the Si—F—Mn solution, the KF solution was added little by little, whereupon a light orange-colored precipitate formed. The precipitate was filtered off with a Büchner funnel, and was drained of liquid as much as possible. Next, it was washed with acetone, drained and vacuum dried, giving 36.3 g of the powder product $K_2SiF_6$:Mn.

The particle size distribution for this powder product was measured in the same way as in Example B1, as a result of which $D_{10}$=0.99 μm, $D_{50}$=3.82 μm and $D_{90}$=7.26 μm.

Example B3

Aside from using 2.66 g of the $K_2MnF_6$ powder produced in Example A3, the same procedure was carried out as in Example B1, giving 36.4 g of the powder product $K_2SiF_6$:Mn.

The particle size distribution for this powder product was measured in the same way as in Example B1, as a result of which $D_{10}$=8.5 μm, $D_{50}$=19.3 μm and $D_{90}$=29.5 μm.

Example B4

Aside from using 2.40 g of the $K_2MnF_6$ powder produced in Example A3, the same procedure was carried out as in Example B2, giving 36.2 g of the powder product $K_2SiF_6$:Mn.

The particle size distribution for this powder product was measured in the same way as in Example B1, as a result of which $D_{10}=0.98$ μm, $D_{50}=3.69$ μm and $D_{90}=7.24$ μm.

Example B5

Aside from using 2.66 g of the $K_2MnF_6$ powder produced in Example A5, the same procedure was carried out as in Example B1, giving 36.5 g of the powder product $K_2SiF_6$:Mn.

The particle size distribution for this powder product was measured in the same way as in Example B1, as a result of which $D_{10}=8.7$ μm, $D_{50}=19.8$ μm and $D_{90}=29.9$ μm.

Example B6

A fluorine and manganese-containing aqueous solution (Ti—F—Mn solution) was prepared by mixing 15.6 cm³ of a 40 wt % aqueous solution of hexafluorotitanic acid ($H_2TiF_6$) (Morita Chemical Industries Co., Ltd.) with 100 cm³ of 50% HF, adding thereto 0.74 g of the same $K_2MnF_6$ powder as that prepared in Example B1, and then stirring to effect dissolution.

Also, a potassium fluoride-containing aqueous solution (KF solution) was prepared by dissolving 23.43 g of $KHF_2$ in 22 cm³ of 50% HF and 34 cm³ of pure water.

Next, the KF solution was added little by little over about 2 minutes to the stirred Ti—F—Mn solution, and the mixture was stirred for about 10 minutes, whereupon a light organic-colored solid formed. This solid product was separated off by filtration, washed with acetone and vacuum dried, giving 13.7 g of a $K_2TiF_6$:Mn powder product. The particle size distribution for this powder product was measured in the same way as in Example B1, as a result of which $D_{10}=13.6$ μm, $D_{50}=46.5$ μm and $D_{90}=103.2$ μm.

Example B7

A Si—F—Mn solution was prepared by dissolving 2.31 g of the compound obtained in Example A9 in the liquid obtained by similarly mixing the same aqueous solution of fluorosilicic acid as in Example B1 into 50% HF.

In a separate operation, a NaF solution was prepared by mixing 33.4 g of sodium hydrogenfluoride (Stella Chemifa Corporation; $NaHF_2$) with 195 cm³ of 50% HF and 195 cm³ of pure water to effect dissolution.

The NaF solution was added little by little to the Si—F—Mn solution while stirring the latter, thereby forming a light orange-colored precipitate. This precipitate was separated off by filtration with a Büchner funnel, and drained of liquid as much as possible. The precipitate was then washed with acetone, drained and vacuum dried, giving 31.1 g of the powder product $Na_2SiF_6$:Mn. The particle size distribution for this powder product was measured in the same way as in Example B1, as a result of which $D_{10}=11.6$ μm, $D_{50}=27.8$ μm and $D_{90}=46.6$ μm.

Comparative Example B1

Aside from using 2.66 g of the manganese intermediate powder produced in Comparative Example A1, the same procedure was followed as in Example B1, giving 35.9 g of the powder product $K_2SiF_6$:Mn.

The particle size distribution was measured in the same way as in Example B1, as a result of which $D_{10}=8.9$ μm, $D_{50}=20.9$ μm and $D_{90}=31.0$ μm.

Comparative Example B2

Aside from using 2.66 g of the manganese intermediate powder produced in Comparative Example A2, the same procedure was followed as in Example B1, giving 35.7 g of a powder product.

The particle size distribution was measured in the same way as in Example B1, as a result of which $D_{10}=9.0$ μm, $D_{50}=21.2$ μm and $D_{90}=31.0$ μm.

Comparative Example B3

Aside from using 0.74 g of the manganese intermediate powder produced in Comparative Example A1, the same procedure was followed as in Example B6, giving 13.6 g of the powder product $K_2TiF_6$:Mn.

The particle size distribution was measured in the same way as in Example B1, as a result of which $D_{10}=13.3$ μm, $D_{50}=44.5$ μm and $D_{90}=99.4$ μm.

The near-surface oxygen levels of the phosphors obtained in Examples B1, B2, B3, B4 and B5 and Comparative Examples B1 were analyzed by x-ray photoelectron spectroscopy in the same way as for the hexafluoromanganates (IV). The results are shown in Table 2.

TABLE 2

|  | Oxygen level (atomic %) |
|---|---|
| Example B1 | 0.69 |
| Example B2 | 0.62 |
| Example B3 | 0.67 |
| Example B4 | 0.58 |
| Example B5 | 0.55 |
| Comparative Example B1 | 2.6 |

In addition, the absorptances and internal quantum efficiencies at an excitation wavelength of 450 nm of the phosphors obtained in Examples B1 to B7 and Comparative Examples B1 to B3 were measured using the QE1100 Quantum Efficiency Measurement System (Otsuka Electronics Co., Ltd.). The results are shown in Table 3. Here, (external quantum efficiency)=(absorptance)×(internal quantum efficiency).

TABLE 3

|  | Absorptance | Internal quantum efficiency | External quantum efficiency | (Remarks: particle size) D50 (μm) |
|---|---|---|---|---|
|  | (excitation wavelength, 450 nm) |  |  |  |
| Example B1 | 0.651 | 0.862 | 0.561 | 19.2 |
| Example B2 | 0.420 | 0.863 | 0.362 | 3.82 |
| Example B3 | 0.641 | 0.827 | 0.530 | 19.3 |
| Example B4 | 0.453 | 0.727 | 0.464 | 3.82 |
| Example B5 | 0.653 | 0.866 | 0.560 | 19.8 |
| Comparative Example B1 | 0.620 | 0.468 | 0.290 | 20.9 |
| Comparative Example B2 | 0.642 | 0.722 | 0.463 | 21.2 |
| Example B6 | 0.663 | 0.643 | 0.426 | 46.5 |
| Comparative Example B3 | 0.668 | 0.432 | 0.229 | 44.5 |
| Example B7 | 0.590 | 0.718 | 0.424 | 27.8 |

REFERENCE SIGNS LIST

10 Reactor
11 Diaphragm
12a, 12b Chambers
13a, 13b Electrodes
14 Stirrer

The invention claimed is:

1. A method for producing hexafluoromanganate (IV), comprising the steps of: inserting an anode and a cathode into a reaction liquid that includes a compound containing manganese having a valence of less than 4 and/or more than 4 and hydrogen fluoride; and passing an electrical current between the anode and cathode at a current density of from 100 to 1,000 A/m$^2$, wherein a reactor in which the reaction liquid is placed is partitioned with a diaphragm into a first chamber for use as an anode chamber in which the anode is inserted and a second chamber for use as a cathode chamber in which the cathode is inserted, and current is passed between the anode and cathode, and wherein a reaction liquid that includes a compound containing manganese having a valence greater than 4 and hydrogen fluoride is placed in the cathode chamber, and a solution that includes hydrogen fluoride and does not include manganese is placed in the anode chamber, or a reaction liquid that includes a compound containing manganese having a valence of less than 4 and hydrogen fluoride is placed in the anode chamber, and a reaction liquid that includes a compound containing manganese having a valence greater than 4 and hydrogen fluoride is placed in the cathode chamber.

2. The production method of claim 1, wherein the diaphragm is an ion-exchange membrane.

3. The production method of claim 1, wherein the electrical current is direct current.

4. The production method of claim 1, wherein an alkali metal fluoride or hydrogenfluoride represented by the formula (1):

$$AF \text{ or } AHF_2 \tag{1}$$

wherein A is one or more alkali metal element selected from the group consisting of lithium, sodium, potassium, rubidium and cesium, and includes at least sodium or potassium, is added to the reaction liquid at any reaction stage from beginning to end such that a hexafluoromanganese(IV) alkali metal salt represented by the formula (2):

$$A_2MnF_6 \tag{2}$$

wherein A is as defined above, precipitates within the reaction liquid and is recovered.

5. A method for producing a complex fluoride phosphor represented by the formula (3):

$$A_2MF_6{:}Mn \tag{3}$$

wherein A is one or more alkali metal element selected from the group consisting of lithium, sodium, potassium, rubidium and cesium, and includes at least sodium or potassium, and M is one or more element selected from the group consisting of silicon, titanium, zirconium, hafnium, germanium and tin, comprising the steps of mixing a hexafluoromanganate (IV) obtained by the production method of claim 1 together with an element A-containing compound and an element M-containing compound, wherein A and M are as defined above, in the presence of hydrogen fluoride.

6. A method for producing hexafluoromanganate (IV), comprising the steps of:

inserting an anode and a cathode into a reaction liquid that includes a compound containing manganese having a valence of III and/or a valence of VI or VII and hydrogen fluoride; and passing an electrical current between the anode and cathode at a current density of from 100 to 1,000 A/m$^2$, wherein a reactor in which the reaction liquid is placed is partitioned with a diaphragm into a first chamber for use as an anode chamber in which the anode is inserted and a second chamber for use as a cathode chamber in which the cathode is inserted, and current is passed between the anode and cathode, and wherein a reaction liquid that includes a compound containing manganese having a valence of VI or VII and hydrogen fluoride is placed in the cathode chamber and a solution that includes hydrogen fluoride and does not include manganese is placed in the anode chamber, or wherein a reaction liquid that includes a compound containing manganese having a valence of III and hydrogen fluoride is placed in the anode chamber and a reaction liquid that includes a compound containing manganese having a valence of VI or VII and hydrogen fluoride is placed in the cathode chamber.

7. The production method of claim 6, wherein the diaphragm is an ion-exchange membrane.

8. The production method of claim 6, wherein the electrical current is direct current.

9. The production method of claim 6, wherein an alkali metal fluoride or hydrogenfluoride represented by the formula (1):

$$AF \text{ or } AHF_2 \tag{1}$$

wherein A is one or more alkali metal element selected from the group consisting of lithium, sodium, potassium, rubidium and cesium, and includes at least sodium or potassium, is added to the reaction liquid at any reaction stage from beginning to end such that a hexafluoromanganese(IV) alkali metal salt represented by the formula (2):

$$A_2MnF_6 \tag{2}$$

wherein A is as defined above, precipitates within the reaction liquid and is recovered.

* * * * *